United States Patent [19]

Mayer et al.

[11] Patent Number: 5,288,318
[45] Date of Patent: Feb. 22, 1994

[54] CELLULOSE ACETATE AND STARCH BASED BIODEGRADABLE INJECTION MOLDED PLASTICS COMPOSITIONS AND METHODS OF MANUFACTURE

[75] Inventors: Jean M. Mayer, N. Smithfield, R.I.; Glenn R. Elion, Chatham, Mass.

[73] Assignee: The United States of America as represented by the Secretary of the Army, Washington, D.C.

[21] Appl. No.: 88,961

[22] Filed: Jul. 1, 1993

[51] Int. Cl.$^5$ .............................. C08L 3/00; C08L 1/12
[52] U.S. Cl. ................................... 106/213; 106/196; 106/210; 106/211; 106/214; 106/203; 106/204; 264/211; 264/211.12; 536/69; 536/102
[58] Field of Search ............... 106/196, 210, 211, 213, 106/214, 203, 204; 264/211.12, 211; 536/69, 102

[56] References Cited

U.S. PATENT DOCUMENTS

| | | | |
|---|---|---|---|
| 1,986,908 | 1/1935 | Yardsley | 260/101 |
| 2,040,801 | 5/1936 | Billing | 260/10 |
| 3,865,603 | 2/1975 | Szymanski et al. | 106/130 |
| 3,870,702 | 3/1975 | Koyanagi et al. | 106/187 |
| 3,940,384 | 2/1976 | Teng et al. | 106/191 |
| 4,016,353 | 4/1977 | Goheen et al. | 536/69 |
| 4,349,531 | 9/1982 | Mlodozenic et al. | 424/27 |
| 4,673,438 | 6/1987 | Wittwer et al. | 106/126 |
| 4,795,641 | 1/1989 | Kashdan | 106/196 |
| 4,983,730 | 1/1991 | Domeshek et al. | 106/196 |
| 5,162,057 | 11/1992 | Akiyama et al. | 106/211 |
| 5,185,382 | 2/1993 | Neumann et al. | 106/210 |
| 5,205,863 | 4/1993 | Elion | 106/154.1 |
| 5,208,267 | 5/1993 | Neumann et al. | 106/210 |

FOREIGN PATENT DOCUMENTS

| | | | |
|---|---|---|---|
| 1728260 | 4/1992 | U.S.S.R. | 106/196 |
| 2023629 | 1/1980 | United Kingdom | 106/213 |

*Primary Examiner*—Karl Group
*Assistant Examiner*—Anthony Green
*Attorney, Agent, or Firm*—Richard J. Donahue; Anthony J. Lane

[57] ABSTRACT

A method and composition are provided for making biodegradable injection molded parts from 30% to 70% cellulose acetate, 10% to 60% unmodified raw (whole) starch and 5% to 35% plasticizer including glycerols and glycerol acetates. Other ingredients that can be used include: starch, flour and paper acetates; gelatin; boric acid; and agricultural fillers. The solid ingredients are combined and fed to an extruder used to make pellets or to feed injection molding equipment. The resulting parts are clear to white or colorful depending upon the added filler materials. The plastics formed are water resistant, high strength and biodegradable.

19 Claims, No Drawings

CELLULOSE ACETATE AND STARCH BASED BIODEGRADABLE INJECTION MOLDED PLASTICS COMPOSITIONS AND METHODS OF MANUFACTURE

The invention described herein may be manufactured, used and licensed by and for the government for governmental purposes without the payment to us of any royalty thereon.

BACKGROUND OF INVENTION

This invention relates to injection molded plastic compositions produced by an extrusion process from a mixture of raw materials including cellulose acetate, whole starch granules and plasticizers. The invention also relates to injection molded plastics containing a range of intact starch granules and their method of manufacture which includes making plastic pellets or molding parts directly from blended powders extruded using both single and twin screw equipment.

Cellulose acetate has been commercially produced for more than 60 years. Different raw materials have been used such as cotton, recycled paper and wood cellulose. The cellulose acetates produced have mainly been in the form of white powders ranging from di to tri acetates mostly for plastic sheets and molded parts. Plasticizers used in the prior art have included triacetin which is made from a reaction with glycerol and acetic acid and other reagents. Most commercial cellulose acetate products are clear, strong, stiff and have a broad range of applications. Cellulose is usually reacted with acetic anhydride. However, for more expensive high performance plastics, other anhydrides may be used such as butyric and proprionic.

Recent emphasis on biodegradable plastics has led to investigations on the biodegradable properties of cellulose acetates. Refer to "Biodegradation of Cellulose Acetates", Charles M. Buchanan et al, Eastman Chemical Company, 1992. In general, those cellulose acetates which have an acetyl substitution number of 2.2 or less are biodegradable in soil and marine environments as well as being compostable. Higher substitution numbers ranging from 2.2 to 3.0 are less biodegradable. Other factors in the rate of biodegradation include the type and quantity of plasticizer present and the amount of residual sulfuric and hydrochloric groups which are introduced in the initial reaction in the form of sulfuric acid or hydrochloric acid or blends of the two, as a homogeneous catalyst. Typical reaction compositions to produce cellulose acetate using cotton fibers are: 2:1 glacial acetic acid to cotton, 1.5:1 acetic anhydride to cotton and 65:1 cotton to sulfuric acid. Reaction temperatures usually are maintained between 5° C. and 35° C.

For cellulose acetate syntheses refer to:
1. U.S. Pat. No. 1,986,908, "Production Of New Compositions Of Matter By The Esterification of Cellulosic Material", Victor Emmanuel Yarsley, Jan. 8, 1935.
2. U.S. Pat. No. 2,040,801, "Method For Production Of Cellulosic Materials From Waste Cellulose Products", Wyly M. Billing, May 12, 1936.
3. U.S. Pat. No. 4,016,353, "Process For Producing Organic Acid Esters Of Cellulose", David Goheen et al, Apr. 5, 1977.
4. U.S. Pat. No. 5,205,863 "Agricultural Biodegradable Plastics", Glenn R. Elion, Apr. 27, 1993.

Starches have been used in injection molded plastics and in blown films. In some cases the material composition can be 100% starch, and in other cases the starch is mixed with water, glycerin and other compounds including vinyl alcohols. For related prior art references see:
5. U.S. Pat. No. 4,673,438, "Polymer Composition For Injection Molding", Fritz Wittwer, Jun. 16, 1987.
6. U.S. Pat. Application Ser. No. 08/010,735, "Method of Producing Biodegradable Starch-Based Product From Unprocessed Raw Materials", Jean M. Mayer et al, Jan. 29, 1993.
7. U.S. Pat. Application Ser. No. 08/047662, "Starch Based Biodegradable Blown Film Compositions And Methods Of Manufacture", Jean M. Mayer et al, Apr. 13, 1993.

In the prior art, the material costs for injection molded plastics using starch blends were too high to be competitive with oil and gas derived plastics. This is because the starch must be reacted and formed under high temperature and pressure into gelatinized or destructured starch pellets and then compounded with other copolymers and additives for various applications. Further, in the prior art, biodegradable plastics containing starch have the intrinsic problem of being too reactive with water to make stable products and most starch products, especially destructurized starch, embrittle over time or at elevated temperatures, rendering them useless in many cases or at the least dramatically reducing their tensile strength and other physical properties relating to structural integrity, such as flexibility, percent elongation at breaking, and toughness.

In the prior art, the most common plasticizer used with cellulose acetate was triacetin. This combination can produce strong clear plastics which are slightly biodegradable but too expensive for mass production and too expensive to compete with oil and gas derived plastics for many applications using plastics such as polystyrene and low or high density polyethylene.

A new composition of matter and method of manufacturing is needed to make cellulose acetate based plastics easily biodegradable, strong, yet of low cost. This invention described below achieves these goals.

SUMMARY OF INVENTION

This invention uses blends of cellulose acetates with plasticizers, starches and other materials. Strong, biodegradable plastics are produced in a simple process in which the ingredients are blended, mixed and fed into a single screw or twin screw extruder and then into an injection molded apparatus, common in the industry. The advantages of these formulations and methods include great manufacturing freedom to produce parts with a wide range of physical flexibility, strength and biodegradability and at the same time allow the manufacturer to introduce fillers and other compounds to provide color, texture, all at a low cost. In some cases the combined cost of materials is less than $1.00/lb and materials may be directly injection molded or else pellets can be made for later use at the same or other facilities. The manufacturer can achieve the lowest unit costs for materials when the compositions and molded parts described herein are made directly from powders.

More specifically, the present invention is directed to a biodegradable plastic comprising between about 10% to 60% by weight starch which contains more than 3% intact starch granules; between 30% to 70% cellulose acetate which has a molecular weight ranging from 28,000 to 62,000 Daltons and a viscosity of 3 to 44 seconds; and between 5% and 35% of a plasticizer selected from the group consisting of triacetin, diacetin, monoacetin, ethylene glycol, propylene glycol and glycerol.

In one embodiment of the present invention, the plasticizer is a blend of two or more of those listed in the group consisting of triacetin, diacetin, monoacetin, ethylene glycol, propylene glycol and glycerol.

The biodegradable plastic may, in some embodiments thereof, further comprise between about 0.1% to 3% by weight boric acid, or may further comprise between about 0.5% and 8% by weight gelling agent selected from the group consisting of gellan gum, xanthum gum, alkali alginates and carrageenan. It may also comprise between about 0.5% and 8% by weight shellac or between about 0.5% and 10% by weight of an agricultural filler selected from the group consisting of milled crustacean shell and nut shell powders.

The starch source in the present invention may be selected from the group consisting of corn, tapioca, potato, sago, wheat, rye, pea, sorghum, rice and arrowroot, and in embodiments where the starch is cornstarch, the cornstarch may contain between about 30% and 75% amylose.

The cellulose acetate in the present invention may, in some embodiments thereof, be partially substituted with natural fiber acetate in the weight range of 1% to 8% by weight, or be partially substituted with paper acetate, flour acetate or a blend of acetate materials wherein the total acetate substitution is in the weight range of 1% to 40%. An extruded or molded product formed of the biodegradable plastic may have a tensile strength of at least 2,400 psi.

The present invention is also directed to a method of forming a biodegradable plastic, the method comprising the following steps: combining on a per weight basis between about 10% to 60% by weight whole starch granules; between 30% to 70% cellulose acetate which has a molecular weight ranging from 28,000 to 62,000 and a viscosity of 3 to 44 seconds to form a first mixture of dry ingredients; combining between 5% and 35% of a plasticizer selected from the group consisting of triacetin, diacetin, monoacetin, ethylene glycol, propylene glycol and glycerol with said first mixture of dry ingredients to form a free flowing second mixture; extruding the second mixture through a die to form pellets wherein the plastic contains at least 3% intact starch granules; and processing the pellets through an injection molder to produce molded items. In this method, the temperature preferably remains between 100° C. and 170° C. for all heated zones including the die.

An alternative method comprises the following steps: combining on a per weight basis between about 10% to 60% by weight whole starch granules; and between 30% to 70% cellulose acetate which has a molecular weight ranging from 28,000 to 62,000 and a viscosity of 3 to 44 seconds to form a first mixture of a dry ingredients; combining between 5% and 35% of a plasticizer selected from the group consisting of triacetin, diacetin, monoacetin, propylene glycol, glycerol and ethylene glycol, to said first mixture of dry ingredients to form a second mixture which is a free flowing uniform powder; and extruding the second mixture through a heated barrel directly into injection molds wherein the plastic contains at least 3% intact starch granules. In this method, the temperature preferably remains between 100° C. and 170° C. for all heated zones including the heated barrel.

DESCRIPTION OF SPECIFIC EMBODIMENTS

The following definitions are presented to aid in understanding the present invention. The specific embodiments are only examples within broader classes.

Biodegradable: Although no generally accepted definition of "biodegradable" exists in the art, for purposes of this application, it refers to a material that substantially completely mineralizes over a period of less than about 10 years to primarily carbon dioxide, water, and sometimes methane or minerals commonly found in the environment. Preferably the material will substantially completely mineralize in less than about 5 years when held in soil or sea water containing natural microorganisms. The rate of mineralization depends on numerous factors including temperature, moisture and types of microorganisms present. In marine environments, the rate also depends on depth and flow rates of water as well as other algae or plants that may interfere with decomposition by attaching themselves to the plastics.

Agricultural fillers which are present in the molded parts of this invention may actually degrade at a slower rate than the plastic blends themselves. For example, some agricultural fillers from crustacean shells contain calcium carbonate and chitin which may tend to degrade slowly in comparison to starch-based plastics.

Unique to cellulose acetates is the ability to control the rate of biodegradation through several factors. One is the amount of residual catalyst left in the material after synthesis. The usual material is sulfuric acid, whose presence in land fill or marine environments tends to cleave the acetate polymers faster and thus accelerate decomposition. The degree of acetyl substitution can also be controlled in reaction variables such as temperature and time profiles, wherein the degree may vary from 1.2 to 3.0. Further, after the reaction is finished, an aging step may be used to alter the solubility of the acetate from chloroform to acetone soluble. By changing the crystalline form in this manner, along with other variables mentioned above, the rate of biodegradation in different environments can be controlled over very wide ranges.

Acetate: For the purposes of this invention, acetate refers to any material usually naturally derived, wherein the dried material is reacted in the presence of glacial acetic acid, acetic or other anhydrides such as butyric or proprionic, and a homogeneous catalyst such as sulfuric acid. Blends of anhydrides may be used and blends of catalysts may also be used including sulfuric, hydrochloric and phosphoric acids. The degree of substitution is measured by the number or percent of acetyl groups which substitute for hydroxyl groups in the starting material. The percent substitution ranges from 20% to 60%. The degree ranges from 1.2 to 3.0. When the degree is near three, the material is called a triacetate. These materials are soluble in glacial acetic acid. Some are soluble in acetone or chloroform and most are insoluble in water. Some forms are slightly soluble in alcohols such as methanol or ethanol.

Cellulose Acetates

The reaction of cellulose in the presence of acetic anhydride yields a group of compounds called cellulose acetates, partially acetylated cellulose, which includes cellulose triacetates $(C_{12}H_{16}O_8)_x$. These acetates differ in the degree of Most do not have a sharp melting point and are insoluble in water and soluble in glacial acetic acid. These materials are used to make sheets, molded parts and fibers by mixing powders with various plasticizers. When blended with plasticizers, the melting points range from 130° C. to 240° C. In commercial production, they are mainly produced from cleaned cotton fibers and are sold on the basis of molecular weight, viscosity and degree of acetylation. The most common forms used for the purposes of this invention have a molecular weight range from 28,000 to 62,000 Daltons and a viscosity range of 3 to 44 seconds, with a typical average of 28 seconds in blends and an acetyl substitution ranging from 34% to 42%.

Flour & Starch Acetates

Acetates can also be synthesized from whole agricultural flours and starches. The method of manufacture is basically the same as for acetates made from cotton, with the exception that an aging period is not required once the reaction is completed. In general these acetates have an acetyl substitution ranging from 1.3 to 2.0, lower than for cotton. The viscosity for these materials is usually lower than for cotton based acetates. They have a final color of the dried powder ranging from tan to brown, with the exception of when pure low protein starches are used as starting materials. In this case the acetate can be white. Depending on the manufacturing process, these materials may have residual particles which are insoluble in glacial acetic acid. These may be removed by filtration or left in the reaction solution. The higher the particulate content, the lower the melt flow index of the final plastic.

The function of these acetates in this invention is that starch and flour acetates can be substituted for cotton based cellulose acetates. The reasons for substitution include; modification of the melt flow index and viscosity, reduction in plastic cost when whole flour acetates are used, and the addition of color to the final product.

Natural Fiber Acetates

Natural fibers from sugar cane processing called sugar cane bagasse, and other natural fibers including kenaf, may be used in blends of cellulose acetates to provide increased structural strength or to reduce unit cost of the blended plastic. Fiber acetates are made in a similar manner to whole flour acetate with the exception that a milling step or series of sizing operations is required prior to reaction. The particle size depends on the starting material and its end use, but in general these fibers would be milled to a −10 mesh particle size. Reduction in particle size also permits a greater exposed surface area for acetyl substitution reactions and reduces the amount of sulfuric acid or other catalyst required in the acetylation. Given the sugar content of bagasse, the reaction products are dark brown.

The yield of acetylated fibers ranges from 1.2 to 1.3 pounds of fiber acetate to 1.0 pound of initial dried fiber. The yield is lower than for flour, starch or cotton acetates since some materials are water soluble by products such as sugars and sugar acetates. The final fibers can be further milled to particle sizes ranging from −20 to −140 mesh. These natural fiber acetates are in the form of needles, in that the length to diameter ratio is usually higher than 10 and may be as high as several hundred. Long fibers may plug the gates in injection molding equipment. Thus, when in blended acetate plastics, these materials must be used in low weight loadings (less than 8%) and must be milled to small particle sizes, such as −50 mesh.

Paper Acetates

Wood pulp and recycled paper can also be used as starting materials for cellulose acetates. In the case of wood pulps, dried milled powders are used. In the case of paper acetates, the paper can be used whole (unprocessed) by shredding or the paper can undergo several processing steps prior to being dried and milled for conversion into acetates. Paper operations prior to reaction may include, shredding, ink removal, bleaching and other operations common in the recycled paper business.

Paper acetates made from recycled paper are low in cost since the raw cellulose materials are less than $0.02/lb. However, due to the higher levels of porosity and acetic acid absorption, these materials require higher ratios of glacial acetic acid in the acetate reaction, as high as 10:1 acetic acid to paper, compared to 2:1 for cotton, starch or whole flour. This increases manufacturing costs by increasing the recycled acid streams in the processing plant.

Paper acetates made from recycled newspapers wherein the ink is not removed are dark brown in appearance. When substituted for cotton based cellulose acetates and extruded, these materials form jet black plastic products. The black color is caused by residual inks and some oxidation within the extruder barrel since the powders contain a significant volume of trapped air. Depending on the method of manufacture, these paper acetates can be substituted for cotton cellulose acetates in a weight range of 1% to 40%. As the weight loading gets higher, the melt flow index decreases, making it more difficult to fill mold cavities with small diameters such as fork tines.

Starch:

For the present invention, suitable starch sources include corn, tapioca, potato, sago, wheat, rye, oat, pea, sorghum, rice and arrowroot. Starch is composed of linear amylose polymers that are water insoluble and branched amylopectin molecules polymers that are water soluble. Amylose varies in size from 100 to 1,000 glucose units and amylopectin is usually about three times larger. The ratio of amylose to amylopectin varies significantly within a species. Starches can be isolated from agricultural flours and can have a broad range of protein contents.

Starch occurs as granules whose size and shape depend upon the plant from which they were derived. In hot water or steam, the granules can swell until they burst. In some cases, bursting partially orders the starch polymer chain, and thereby increases the material's tensile strength. If some granules remain intact while others burst, the intact granules act as a biodegradable filler within the plastic formulation matrix. Staining with iodine can be used to measure the relative percentage of broken (or gelatinized) granules and intact granules.

Starch products have some residual water content which varies with relative humidity. Thus, some starch-based plastic formulations tend to gain weight in environments having high relative humidity. Raw starches may contain 7% to 14% moisture depending on relative humidity. When the hot injection molded plastic is exposed to air in the die, some moisture is lost, keeping the water content of the parts made with this invention within a low range compared to other starch based plastics. In this invention, the water content of the final plastic is less than 4% by weight.

Glycerin:

Glycerin is marketed in several grades including dynamite, yellow distilled, USP (U.S. Pharmacopoeia) and CP. Any of these grades are suitable as plasticizers for this invention. However, when molded plastics are to be used for direct contact with food or skin, USP is preferred, especially for products such as disposable utensils. In some cases, other compounds may be added to glycerin prior to its use as a plasticizer in this invention such as gelatin or other gelling agents and boric acid. In the weight loading specified herein, the gelling agents and boric acid are completely soluble in glycerol. At higher weight loadings of gelatin, the glycerol may have to be heated slightly to get all of the gelling agent into solution prior to being blended with the cellulose acetate and starch materials.

Glycerol Acetates:

Glycerol can be reacted with acetyl groups to form mono, di and triacetins. Vacuum distillation is sometimes used to separate the different analogs thus formed. Their physical properties vary significantly as well as their acceptance in compositions used for food grade materials. Triacetin or glycerin triacetate has a molecular weight of 218.21, a boiling point of 258° C. and a melting point of 4° C., with a density of 1.1596. Monoacetin has a molecular weight of 134.13, a boiling point of 158° C. and a density of 1.2060.

Diacetin has a molecular weight of 176.17, a boiling point of 280° C. and a melting point of 40° C., with a density of 1.4395. With current FDA regulations, diacetin is considered not as safe as the other glycerol acetins. Although triacetin is FDA approve for food contact, in practice most commercial grades are mixed analogs which contain blends of mono- and diacetins as well as the triacetin.

Ethylene/Propylene Glycol:

Ethylene glycol, $HOCH_2CH_2OH$, is a clear liquid with a melting point of $-12°$ C., a boiling point of 198° C. and a density of 1.113. Propylene glycol, $CH_3CH(OH)CH_2OH$ is also a clear liquid with a melting point of $-60°$ C., a boiling point of 187° C. and a density of 1.036. At high temperatures propylene glycol may oxidize giving rise to by-products including acetic acid. Propylene glycol is FDA approved and as such may be preferred over ethylene glycol as a plasticizer in biodegradable films. Propylene glycol when mixed with cellulose acetate powders, forms a free flowing mixture which easily feeds into the feed hopper of extruders, when the weight percent loading is kept below 35%.

These glycols will completely dissolve boric acid which may be added into the formulation. However, some gelling agents such as gelatin will not completely dissolve in these glycols at higher weight loadings, but when vigorously stirred, these blends will form small particle sizes suitable for uniform blending of powders prior to extrusion to form pellets or injection molded parts.

Gelatin & Gelling Agents:

Gelatin is sold commercially in a number of different forms with colors ranging from yellow to clear. Food grade gelatin is usually sold as a clear to white powder with a granule or particle size of about $-20$ to $-50$ mesh. Gelatin is available as Type A (acid hydrolyzed) or Type B (hydrolyzed with base) or other categories relating to molecular weight and other properties. In this invention, all commercial grades of gelatins can be used. Gelatin can be preblended with glycerols and other ingredients such as boric acid and then added to the dry powders, or it can be added directly as a dry free flowing powder in the blend with cellulose acetate and other ingredients.

Other gelling agents may be used in this invention including xanthum gum, Gellan Gum TM (Gellan is a registered trademark of the Kelco Company) and alkali alginates. The temperature profiles used in the extruders can be kept under 150° C. such that most gelling agents will remain stable. At higher temperatures such as those required to destructure starch granules, the gelling agents would partially decompose as indicated by a low viscosity or a yellow color. Most gelling agents described herein are soluble in glycerol and partially or completely soluble in propylene or ethylene glycol. Gelling agents serve the function of reducing the effects of starch embrittlement at elevated temperatures, low humidities or extended periods of time (natural or accelerated aging). In some cases, their cost is lower than that for pure cellulose acetate and thus their incorporation in blends may reduce the overall plastic price per unit weight.

Shellac

Shellac is a complex mixture of low molecular weight resinous compounds which is refined from a beetle excretion following its consumption of a particular tree sap. It is used as a coating for fruits and candies as well as a non-toxic furniture finishing resin. Its melting temperature is approximately 80° C. and it begins to crosslink at temperatures greater than 160° C. The water-resistance of cellulose acetate/starch injection molded plastics can be improved by the addition of shellac. Amounts greater than 1% by weight result in products with a yellow tint since the shellac powder has a natural light yellow color which cannot easily be masked.

Boric Acid:

Boric acid, $H_3BO_3$, is a white crystalline solid which melts at 171° C. It is used in a variety of applications such as a fire retardant for cellulosic materials and the production of borosilicate glass, ceramic glazes and porcelain enamels. In addition, although it is non-toxic to mammals, it exhibits bacteriostatic properties, fungicidal and insecticidal properties. These properties could improve the storage stability of biodegradable products, yet after disposal, the boric acid would leach out and the polymeric components of the formulation would then biodegrade. Boric acid has been shown to form complexes with hydroxyl containing compounds such as mannitol, sorbitol and polyvinyl alcohol. They could also crosslink with starch, and glycerol compounds since they also contain hydroxyl groups. The primary function of boric acid in this invention is as a crosslinking agent for the hydroxyl containing compounds to reduce embrittlement during storage or at elevated temperatures and to increase the strength of the parts even at higher weight loading levels of starch.

Fillers:

Fillers can add color, increase or alter tensile and compressive strengths, act as nucleating agents, and/or reduce the unit cost of the injection molded parts. The compositions of this invention can employ several types of fillers. One group includes agricultural fillers such as nut and crustacean shells. The injection molded compositions of this invention may include 0.5% to 10% by dry weight filler. Although higher weight loadings can be achieved, the melt flow properties rapidly degrade when the filler constitutes more than about 12% to 15% by weight of the plastic. Preferably, the filler will be a free flowing $-100$ mesh powder having a low moisture content. Suitable methods of preparing agricultural fillers are presented below.

Crab & Lobster Shell:

These shells are first crushed or milled to about a one inch size either wet or dry. The shells are then oven dried at 80° C. to 130° C. until they are dry enough to be milled without plugging the mill screens. The drying time varies according to the type of commercial equipment used as well as with temperature and air flow. The shells are next milled to a particle size of −50 mesh and then further oven dried at 130° C. to 140° C. to remove residual water and lower boiling aromatics until no further weight loss is detected. The shells are then milled to their final size of −100 to −140 mesh.

Crab and lobster shells will lose about 11% of their total weight when heated as prescribed above. At this point the shell powder should be relatively free from odor, free flowing, dry and stable as pertaining to long term drum storage. If a mild odor is detected, the material can be heated prior to use at a temperature of up to 140° C. for a period of time sufficient to satisfy the use or product application.

Nut Shell:

Nut shell powder is preferably prepared in successive stages. First the shells are milled to a particle size of −10 mesh. Then the shells are milled to a −50 mesh size. At this point the powder is oven cured at 130° C. Higher temperatures can be used but will darken the powder. The shells are then milled to their final particle size of −100 to −140 mesh. Nut shell fillers are highly hygroscopic. Most will lose about 10% of their total weight when heated as prescribed above.

Shrimp Shell:

Shrimp shell can be prepared by two methods. The first method is the same as the method described above for lobster and crab. However, using this method there will still be significant odor or shrimp fragrance in the final dried powder. If this odor is objectionable for a given application, the bulk of the aromatic content of the shells can be removed as follows. Slowly mix the shrimp shell filler having a particle size of −10 mesh or smaller with bleach (a 5% sodium hypochlorite solution). The reaction is exothermic and generates significant volumes of gas. Stir this mixture for 20 to 30 hours or until no further gas bubble generation is noted. Then remove the bleach solution from the shells using a −100 or −140 mesh screen. Wash the treated shells with water in a volume equal to at least the weight of the shells. With each washing allow the water to remain in contact with the shell powder for a minimum of 30 minutes to remove as much of the bleach as possible from the smaller pores of the shell particles. The treated shell particles are then dried at 130° C. until no further weight loss is noted. The filler can then be sized as needed, typically to a −100 to −140 mesh particle size in a hammer mill, grinder or other suitable commercial equipment.

Examples

1. Cellulose Acetate, Starch & Triacetin:

In a glass beaker the following ingredients are mixed together: 1000 grams of cellulose acetate (Eastman Kodak, acetyl substitution 39.8%, viscosity 28 seconds), 200 grams of corn starch (Best Foods, Argo brand) and 250 grams of triacetin (Eastman Kodak). The blend is then fed through a single screw steam jacketed extruder with a strand die containing four small holes. The extruded strands are about 3 mm to 5 mm in diameter which are cut with a rotating blade cutter into pieces ranging in size from 2 to 5 mm in length. The extruded plastic is tested using a Custom Scientific Mini Injection Molder which has an ASTM standard tensile bar die. The bars are formed by heating 1.7 grams of pellets for three minutes at 180° C. The resulting bars have a maximum load at break of 83 lbs and are white.

2. Cellulose Acetate, Starch & Monoacetin:

The same composition and method as in $\doteq$1 above was used except that monoacetin was used instead of triacetin. The resulting bars have a maximum load at break of 86 lbs and are white.

3. Cellulose Acetate, Starch, Shrimp Shell Filler:

In a glass beaker the following ingredients are mixed together: 1050 grams of cellulose acetate (Eastman Kodak, acetyl substitution 39.4%, viscosity 3 seconds), 250 grams of corn starch (Best Foods, Argo brand), 220 grams of triacetin (Eastman Kodak) and 80 grams of bleach treated shrimp shell. The blend is then fed through a single screw steam jacketed extruder with a strand die containing four small holes. The extruded strands are about 3 mm to 5 mm in diameter which are cut with a rotating blade cutter into pieces ranging in size from 3 to 8 mm in length. The extruded plastic is tested using a Custom Scientific Mini Injection Molder which has an ASTM standard tensile bar die. The bars are formed by heating 1.7 grams of pellets for three minutes at 180° C. The resulting tensile bars made from this filled plastics have a maximum load at break of 89 lbs and are pink and opaque.

4. Cellulose Acetate, Starch. Propylene Glycol

In a glass beaker the following ingredients are mixed together: 230 grams of cellulose acetate (Eastman Kodak, acetyl substitution 39.8%, viscosity 28 seconds), 60 grams of corn starch (Best Foods, Argo brand) and 90 grams of propylene glycol. The blend is then fed through a twin screw electrically heated extruder with a strand die containing four holes, each 4 mm in diameter. The extruded strands are about 5 mm to 7 mm in diameter which are cut after being cooled, with a rotating blade cutter into pieces ranging in size from 3 to 8 mm in length. The extruded plastic is tested using a Custom Scientific Mini Injection Molder which has an ASTM standard tensile bar die. The bars are formed by heating 1.7 grams of pellets for three minutes at 180° C. The resulting tensile bars made from this plastic have a maximum load at break of 63 lbs and are white.

5. Cellulose Acetate, Starch, Propylene Glycol, Shellac

In a glass beaker, the following ingredients are mixed together: 213 grams of cellulose acetate (Eastman Kodak, acetyl substitution 39.8%, viscosity 28 seconds), 102 grams of corn starch (Best Foods, Argo brand), 90 grams propylene glycol, and 4 grams shellac (Mantrose-Hauser). The blend is then fed through a single screw electrically heated extruder with a strand die containing four holes, each 4 mm in diameter. The extruded strands are about 5 mm in diameter which are cut after being cooled, with a rotating blade cutter into pieces ranging from 3 to 8 mm in length. The extruded plastic is tested using a Custom Scientific Mini Injection Molder which has an ASTM standard tensile bar die. The bars are formed by heating 1.7 grams of pellets for three minutes at 180° C. The resulting tensile bars made from this plastic have a maximum load at break of 75 lbs and are pale yellow.

6. Cellulose Acetate, Starch, Propylene Glycol, Boric Acid

In a glass beaker the following ingredients are mixed together: 210 grams of cellulose acetate (Eastman Kodak, acetyl substitution 39.8%, viscosity 28 seconds), 100 grams of corn starch (Best Foods, Argo brand), 90 grams of propylene glycol and 4 grams of boric acid. The blend is then fed through a twin screw electrically heated extruder with a strand die as in #4 above. The extruded plastic is tested using a Custom Scientific Mini Injection Molder which has an ASTM standard tensile bar die. The bars are formed by heating 1.7 grams of pellets for three minutes at 1800C. The resulting tensile bars made from this plastic have a maximum load at break of 59 lbs and are translucent to white.

7. Cellulose Acetate, Starch, Propylene Glycol, Boric Acid, Gelatin

In a glass beaker the following ingredients are mixed together: 170 grams of cellulose acetate (Eastman Kodak, acetyl substitution 39.8%, viscosity 28 seconds), 140 grams of corn starch (Best Foods, Argo brand), 90 grams of propylene glycol, 5 grams of boric acid and 10 grams of gelatin. The blend is then fed through a twin screw electrically heated extruder with a strand die as in #4 above. The extruded plastic is tested using a Custom Scientific Mini Injection Molder which has an ASTM standard tensile bar die. The bars are formed by heating 1.7 grams of pellets for three minutes at 180° C. The resulting tensile bars made from this plastic have a maximum load at break of 57 lbs and are opaque and white with a slight yellow tint.

8. Cellulose Acetate, Paper Acetate, Triacetin:

In a glass beaker the following ingredients are mixed together: 5 grams cellulose acetate (Eastman Kodak, acetyl substitution 39.8%, viscosity 28 seconds), 3 grams recycled newspaper acetate, 2 grams of triacetin. The blended plastic is tested using a Custom Scientific Mini Injection Molder which has an ASTM standard tensile bar die. The tensile bars made from this material are black and have a maximum load at break of 94 lbs.

9. Cellulose Acetate, Flour Acetate, Monoacetin:

In a glass beaker the following ingredients are mixed together: 5 grams cellulose acetate (Eastman Kodak, acetyl substitution 39.8%, viscosity 28 seconds), 3 grams corn flour acetate, 2 grams of monoacetin. The blended plastic is tested using a custom Scientific Mini Injection Molder which has an ASTM standard tensile bar die. The tensile bars made from this material are brown and have a maximum load at break of 83 lbs.

10. Cellulose Acetate, Fiber Acetate, Triacetin:

In a glass beaker the following ingredients are mixed together: 7 grams cellulose acetate (Eastman Kodak, acetyl substitution 39.8%, viscosity 28 seconds), 0.8 grams sugar cane bagasse fiber acetate, 2.2 grams of monoacetin. The blended plastic is tested using a Custom Scientific Mini Injection Molder which has an ASTM standard tensile bar die. The tensile bars made from this material are smooth, brown and have a maximum load at break of 71 lbs.

Many other compositional combinations and ranges were tested for this invention by mixing powders and directly making ASTM tensile bars using the Mini Injection Molder. This is a rapid and effective means of exploring the large number of variables claimed in this invention. The better combinations were used in the extruder to test plastic performance in larger test volume batch sizes and to verify the direct correspondence between direct powder mixing and extruded plastic performance physical properties. In the extrusion process, fewer starch granules are left intact compared to using the small ASTM standard molds directly from small batches of blended powders. Although compositions for each ingredient used were tested outside of the ranges claimed below, only those ranges which are of practical value in commercial applications have been claimed.

What is claimed is:

1. A biodegradable plastic comprising: between about 10% to 60% by weight starch which contains more than 3% intact starch granules; between 30% to 70% cellulose acetate which has a molecular weight ranging from 28,000 to 62,000 Daltons and a viscosity of 3 to 44 seconds; and between 5% and 35% of a plasticizer selected from the group consisting of triacetin, diacetin, monoacetin, ethylene glycol, propylene glycol and glycerol.

2. The biodegradable plastic of claim 1 wherein the said plasticizer is a blend of two or more of those listed in the group consisting of triacetin, diacetin, monoacetin, ethylene glycol, propylene glycol and glycerol.

3. The biodegradable plastic of claim 1 further comprising between about 0.1% to 3% by weight boric acid.

4. The biodegradable plastic of claim 1 further comprising between about 0.5% and 8% by weight gelling agent selected from the group consisting of gellan gum, xanthum gum, alkali alginates and Carrageenan.

5. The biodegradable plastic of claim 1 further comprising between about 0.5% and 8% by weight shellac.

6. The biodegradable plastic of claim 1 further comprising between about 0.5% and 10% by weight of an agricultural filler selected from the group consisting of milled crustacean shell and nut shell powders.

7. The biodegradable plastic of claim 1 wherein the said starch is selected from the group consisting of corn, tapioca, potato, sago, wheat, rye, pea, sorghum, rice and arrowroot starch.

8. The biodegradable plastic of claim 1 wherein the said starch is cornstarch.

9. The biodegradable plastic of claim 8 wherein the said cornstarch contains between about 30% and 75% amylose.

10. The biodegradable plastic of claim 1 wherein the said cellulose acetate is partially substituted with paper acetate in the weight range of 1% to 40% by weight.

11. The biodegradable plastic of claim 1 wherein the said cellulose acetate is partially substituted with natural fiber acetate in the weight range of 1% to 8% by weight.

12. The biodegradable plastic of claim 1 wherein the said cellulose acetate is partially substituted with starch acetate in the weight range of 1% to 40% by weight.

13. The biodegradable plastic of claim 1 wherein the said cellulose acetate is partially substituted with flour acetate in the weight range of 1% to 40% by weight.

14. The biodegradable plastic of claim 1 wherein the said cellulose acetate is partially substituted with a blend of acetate materials and wherein the total acetate substitution blend is in the weight range of 1% to 40%.

15. An extruded or molded product formed from the biodegradable plastic of claim 1 wherein the said extruded or molded product has a tensile strength of at least about 2,400 psi.

16. A method of forming a biodegradable plastic, the method comprising the following steps:

combining on a per weight basis between about 10% to 60% by weight whole starch granules, and between 30% to 70% cellulose acetate which has a molecular weight ranging from 28,000 to 62,000 and a viscosity of 3 to 44 seconds to form a first mixture of dry ingredients;

combining between 5% and 35% of a plasticizer selected from the group consisting of triacetin, diacetin, monoacetin, ethylene glycol, propylene glycol and glycerol, with said first mixture of dry ingredients to form a free flowing second mixture;

extruding said second mixture through a die to form pellets of plastic having at least 3% intact starch granules; and processing the pellets through an injection molder to produce molded items.

17. The method of claim 16 wherein a temperature between 100° C. and 170° C. is maintained for all heated zones including the die.

18. A method of forming a biodegradable plastic, the method comprising the following steps:

combining on a per weight basis between about 10% to 60% by weight whole starch granules, and between 30% to 70% cellulose acetate which has a molecular weight ranging from 28,000 to 62,000 and a viscosity of 3 to 44seconds to form a first mixture of dry ingredients;

combining between 5% and 35% of a plasticizer selected from the group consisting of triacetin, diacetin, monoacetin, propylene glycol, glycerol and ethylene glycol, to said first mixture of dry ingredients to form a second mixture which is a free flowing uniform powder; and extruding said second mixture through a heated barrel directly into injection molds to form a plastic having at least 3% intact starch granules.

19. The method of claim 18 wherein a temperature between 100° C. and 170° C. is maintained for all heated zones including the heated barrel.

* * * * *